(12) United States Patent
Nogami et al.

(10) Patent No.: US 9,898,630 B2
(45) Date of Patent: Feb. 20, 2018

(54) INTERROGATION DEVICE, SYSTEM INCLUDING INTERROGATION DEVICE, AND PROGRAM

(71) Applicant: OMRON Corporation, Kyoto-shi, Kyoto (JP)

(72) Inventors: Hidekatsu Nogami, Kusatsu (JP); Yoshimitsu Nakano, Ritto (JP); Tomohiro Nishimura, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/440,160

(22) Filed: Feb. 23, 2017

(65) Prior Publication Data

US 2017/0316231 A1    Nov. 2, 2017

(30) Foreign Application Priority Data

Apr. 28, 2016  (JP) .................................. 2016-091070

(51) Int. Cl.
G06K 7/10 (2006.01)
G06K 19/077 (2006.01)
G06K 7/00 (2006.01)

(52) U.S. Cl.
CPC ....... *G06K 7/10138* (2013.01); *G06K 7/0008* (2013.01); *G06K 7/10009* (2013.01); *G06K 7/10435* (2013.01); *G06K 19/07758* (2013.01)

(58) Field of Classification Search
CPC ............. G06K 7/10138; G06K 7/0008; G06K 7/10009; G06K 7/10435; G06K 19/07758
See application file for complete search history.

(56) References Cited

U.S. PATENT DOCUMENTS

| 2008/0042803 | A1* | 2/2008 | Posamentier | G06K 7/0008 340/10.1 |
| 2008/0150692 | A1* | 6/2008 | Missimer | G06K 7/10039 340/10.1 |
| 2009/0303006 | A1* | 12/2009 | Eggers | H04Q 9/00 340/10.1 |
| 2013/0169417 | A1 | 7/2013 | Sugano et al. | |
| 2014/0167920 | A1 | 6/2014 | Kamiya | |
| 2015/0227766 | A1 | 8/2015 | Koezuka et al. | |

FOREIGN PATENT DOCUMENTS

EP          2894589 A1       7/2015
JP     2013-037663 A        2/2013

OTHER PUBLICATIONS

The extended European search report dated Sep. 8, 2017 in the counterpart European patent application.

* cited by examiner

*Primary Examiner* — Leon Flores
(74) *Attorney, Agent, or Firm* — Metrolexis Law Group, PLLC (57) ABSTRACT

A controller in an interrogation device performs, for each RF tag passing through an interrogation zone that is defined near an interrogation unit, an integration process of integrating a strength of a reception signal from the RF tag received by the interrogation unit. The integration process includes weighting of an integral value of the strength of the reception signal in a manner to cause an integrate value calculated for each reception signal to be larger than an integral value calculated for a preceding reception signal. When an RF tag moves to a predetermined position in the interrogation zone, the controller transmits, to a host device, an identifier of an RF tag having a maximum integral value selected from the integrated value calculated for each RF tag.

13 Claims, 8 Drawing Sheets

INTERROGATION DEVICE, SYSTEM INCLUDING INTERROGATION DEVICE, AND PROGRAM

CROSS-REFERENCES TO RELATED APPLICATIONS

This application claims priority to Japanese Patent Application No. 2016-091070 filed Apr. 28, 2016, the entire contents of which are incorporated herein by reference.

FIELD

The present invention relates to an interrogation device that interrogates radio frequency (RF) tags in a contactless manner, a system including an interrogation device, and a program.

BACKGROUND

Short-range wireless communication techniques have been used in various fields to transmit and receive data in a contactless manner. Radio frequency identification (RFID) is a widespread, typical short-range wireless communication technique. A common RFID system includes an RF tag attached to a target object (hereafter, a workpiece) or an object such as a pallet or a container supporting or containing the target object, an interrogation device (hereafter, a reader/writer) that transmits and receives data to and from the RF tag, and a host device that controls the reader/writer.

At production sites such as factories and at sites for physical distribution management, accurately transmitting and receiving data is important to improve production efficiency and management efficiency. Interrogation with RFID tags is desired to avoid reading unintended RFID tags (hereafter, over-reading) and avoid failing to read intended RFID tags (hereafter, under-reading). Over-reading occurs when an unintended RFID tag is determined as a target for a read/write process, whereas under-reading occurs when an intended RFID tag cannot be determined as a target for a read/write process.

To prevent over-reading and under-reading, a technique for identifying a target RFID tag is described in, for example, Japanese Unexamined Patent Application Publication No. 2013-037663 (Patent Literature 1). Patent Literature 1 describes a method for identifying a target RFID tag based on the reading count, changes in the strength of a received signal, and changes in the phase of the received signal.

CITATION LIST

Patent Literature

Patent Literature 1: Japanese Unexamined Patent Application Publication No. 2013-037663

SUMMARY

Technical Problem

With the method described in Patent Literature 1, a target RFID tag is identified using the reading count, changes in the strength of a received signal, and changes in the phase of the received signal. However, the method described in Patent Literature 1 identifies a tag that is not moving and a tag that is moving. This method thus cannot identify a target tag when a tag to be read and a tag not to be read are both moving.

The demand is increasing for a simple structure that identifies a target tag (workpiece) for an interrogation process when tags are moving.

Solution to Problem

An interrogation device according to one aspect includes an interrogation unit that interrogates an RF tag in a contactless manner, a communication unit that transmits and receives data to and from a host device, and a controller that controls the interrogation unit and the communication unit. The controller performs, for each RF tag passing through an interrogation zone that is defined near the interrogation unit, an integration process of integrating a strength of a reception signal from the RF tag received by the interrogation unit. In the integration process, the controller performs integration after weighting an integral value of the strength of the reception signal in a manner to cause an integral value calculated for each reception signal to be larger than an integral value calculated for a preceding reception signal. When an RF tag moves to a predetermined position in the interrogation zone, the controller transmits, from the communication unit to the host device, an identifier of an RF tag having a maximum integral value selected from the integrated value calculated for each RF tag.

When an RF tag moves to the predetermined position in the interrogation zone, the interrogation device with the above structure transmits, to the host device, the identifier of an RF tag having a maximum integral value selected from weighted integral values of the strength of reception signals received from RF tags passing through the interrogation zone. In this manner, the host device can identify an RF tag to be a processing target for interrogation using an identifier obtained from the interrogation device every time when an RF tag has moved to the predetermined position in the interrogation zone. A simple structure using the weighted integration described above can thus identify a target tag (workpiece) when RF tags are moving.

In some embodiments, in the integration process, the controller weights the strength of every reception signal received by the interrogation unit from an RF tag passing through the interrogation zone, and integrates the weighted strength for each RF tag.

In the above integration process using weighting, the integration is performed using weighting of the strength of every reception signal received from each RF tag.

In some embodiments, in the integration process, the controller weights the integral value of the strength of the reception signal in a manner to cause an integral value calculated for each reception signal to be larger than an integral value calculated for a preceding reception signal.

In the above integration process using weighting, the controller can thus weight the integral value of the strength of a reception signal from each RF tag every time when the signal strength is integrated.

In some embodiments, the controller changes a weight value used in the weighting. Thus, the integration process can be performed while changing the weight.

In some embodiments, when the strength of the reception signal from the RF tag changes to a value smaller than the strength of a preceding reception signal, the controller sets a smaller weight than used for the preceding reception signal.

In this manner, when the strength of a reception signal from each RF tag changes to a smaller value, the controller sets a smaller weight to calculate a smaller integral value for the RF tag more promptly. In this case, the RF tag for which the strength of a reception signal decreases can be excluded earlier from an identification target.

In some embodiments, when the strength of the reception signal from the RF tag is unchanged from the strength of a preceding reception signal from the RF tag, the controller excludes the strength of the reception signal from the RF tag from the integration process.

An RF tag for which the strength of a reception signal is unchanged, or for example, an RF tag that is stationary, can thus be excluded from an identification target.

A system according to another aspect includes an interrogation device and a host device. The interrogation device includes an interrogation unit that interrogates an RF tag in a contactless manner, a communication unit that transmits and receives data to and from the host device, and a controller that controls the interrogation unit and the communication unit. The controller performs, for each RF tag passing through an interrogation zone that is defined near the interrogation unit, an integration process of integrating a strength of a reception signal from the RF tag received by the interrogation unit. In the integration process, the controller performs integration while weighting an integral value of the strength of the reception signal in a manner to cause an integral value calculated for each reception signal to be larger than an integral value calculated for a preceding reception signal. When an RF tag moves to a predetermined position in the interrogation zone, the controller transmits, from the communication unit to the host device, an identifier of an RF tag having a maximum integral value selected from the integrated value calculated for each RF tag.

A program according to still another aspect enables an interrogation device to implement an interrogation method. The interrogation device includes an interrogation unit that interrogates an RF tag in a contactless manner, and a processor. The program enables the processor to implement performing, for each RF tag passing through an interrogation zone that is defined near the interrogation unit, an integration process of integrating a strength of a reception signal from the RF tag received by the interrogation unit, performing the integration process including weighting of an integral value of the strength of the reception signal in a manner to cause an integral value calculated for each reception signal to be larger than an integral value calculated for a preceding reception signal, and transmitting, to the host device, an identifier of an RF tag having a maximum integral value selected from the integrated value calculated for each RF tag when an RF tag moves to a predetermined position in the interrogation zone.

Advantageous Effects

A simple structure of the embodiments identifies a target tag (workpiece) for an interrogation process.

DETAILED DESCRIPTION

Embodiments of the present invention will now be described in detail with reference to the drawings. The same or corresponding components in the figures are given the same reference numerals, and will not be described redundantly.

A radio frequency identification (RFID) system will now be described as a typical example of a system including an interrogation device that performs short-range wireless communication. In a common RFID system, an interrogation device is often referred to as a reader/writer indicating its functions. The interrogation device herein is thus also referred to as a reader/writer. The interrogation device may not have both the function of reading data from an RF tag (reader function) and the function of writing data to an RF tag (writer function), and may have at least one of the two functions.

Although an RF tag may also be commonly called an IC tag or an RFID tag, the term RF tag will be used herein.

Although RFID is a typical example of short-range wireless communication, any other schemes developed based on the RFID technique can fall within the technical scope of the invention. Although communication based on RFID uses signals in the ultrahigh frequency (UHF) band in the embodiments, signals in other signal bands can also fall within the technical scope of the invention.

Overview

In the embodiment, an integration process is performed for every RF tag 300 passing through an interrogation zone AR that is defined near an interrogation unit included in a reader/writer 200 to integrate the strength of each reception signal from the RF tag. The integration process includes weighting of an integral value of the strength of the reception signal performed in a manner to cause an integral value calculated for each reception signal to be larger than an integral value calculated for a preceding reception signal. When the RF tag 300 moves to a predetermined position in the interrogation zone AR, the reader/writer 200 transmits, to a device 100, the identifier of an RF tag 300 having a maximum integral value selected from the integrated value calculated for each RF tag 300.

In the embodiment, the interrogation zone AR is a zone within which the RF tag 300 and the reader/writer 200 can transmit and receive data between them.

The device 100 sets, as a target for a read/write process, an RF tag 300 that has moved to a position nearest the interrogation unit in the interrogation zone AR. A trigger TR is output when the RF tag 300 has moved to the position nearest the interrogation unit.

In the embodiment, the above weighted integration maximizes the integral value of the RF tag 300 that has moved to the position nearest the interrogation unit. When each RF tag 300 passes through the interrogation zone AR, a target RF tag 300 for a read/write process can be determined by selecting an RF tag 300 having a maximum integral value upon reception of an input trigger. The RF tag 300 is identified in this manner to identify a workpiece W to which the RF tag 300 is attached.

The integration process of a reception signal generated from unexpected noise, which occurs irregularly, yields a small integral value. The small integral value does not affect determination of the target RF tag 300.

Overview of System Configuration

Figure 1:
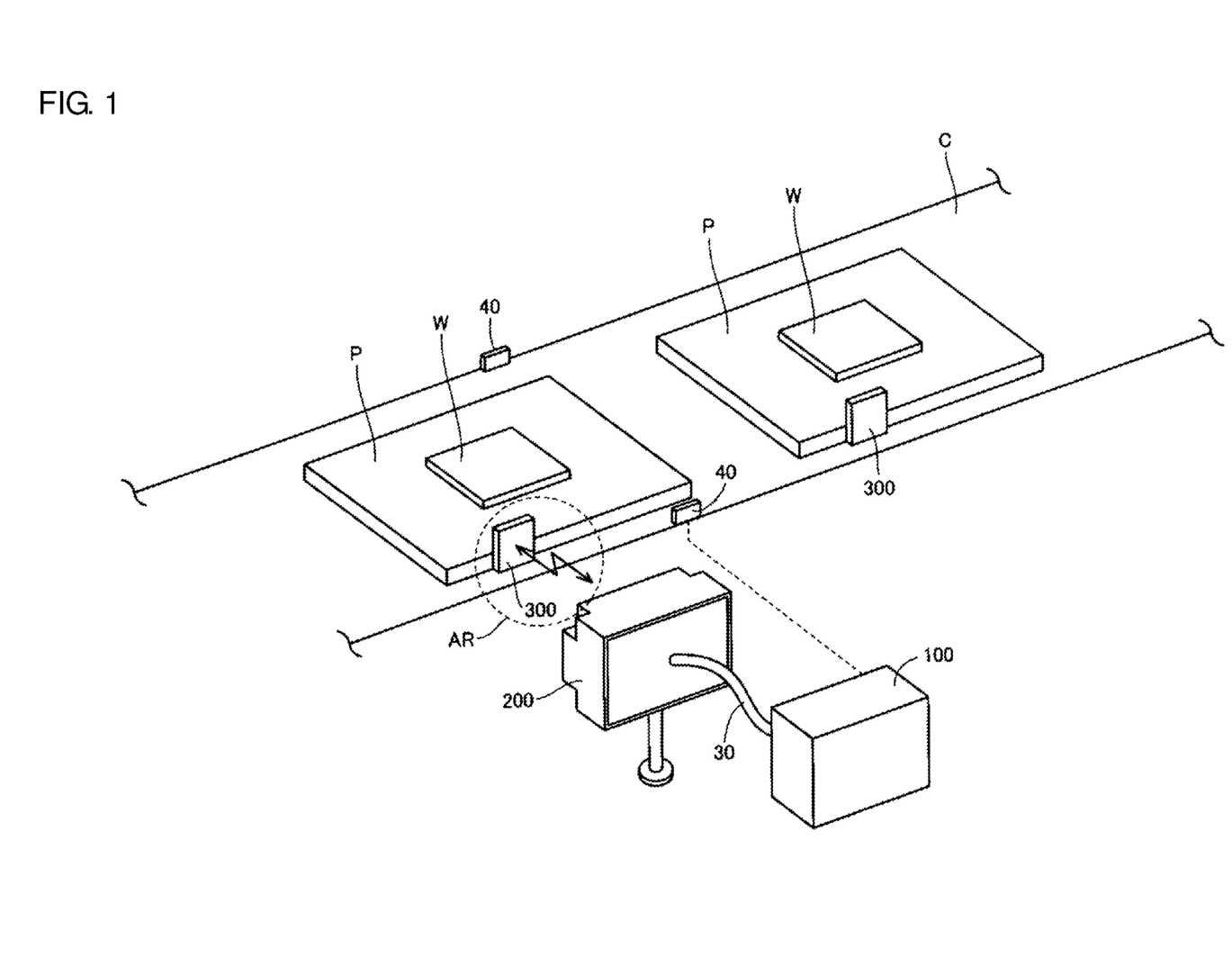
FIG. 1 is a schematic diagram showing the configuration of an RFID system installed at a production line of a factory according to an embodiment.

FIG. 1 is a schematic diagram showing the configuration of an RFID system installed at a production line of a factory according to the embodiment. As shown in FIG. 1, the RFID system includes a plurality of RF tags 300, the reader/writer 200, and the device 100, which is a host device such as a personal computer or a programmable logic controller. Each RF tag 300 is attached to a pallet P, which supports a workpiece W. A proximity switch 40 is arranged on a conveyor C to detect an RF tag 300. The reader/writer 200 writes or reads information to or from an RF tag 300 while the workpiece W on the pallet P with the RF tag 300 is moving on the belt conveyor C.

The reader/writer 200 includes an antenna, which is selected from different antennas with different circuit characteristics, and an interrogation controller, which is commonly used for various models. The reader/writer 200 is connected to the device 100 with a cable 30. The reader/writer 200 may be connected wirelessly to the device 100, instead of using the cable 30.

The reader/writer 200 is installed near the conveyor C. When a pallet P enters an interrogation zone in which the reader/writer 200 can interrogate an RF tag 300 (hereafter also referred as the interrogation zone AR), the reader/writer 200 starts interrogating the RF tag 300. This interrogation process includes an ID reading process for identifying an RF tag 300 (hereafter, a target RF tag 300), and a read/write process performed using the reader function or the writer function. The RF tags 300 pass through the interrogation zone AR defined near the interrogation unit of the reader/writer 200 either at regular or irregular intervals.

In the embodiment, the proximity switch 40 transmits a signal to the device 100 when detecting an RF tag 300 that has moved to a position nearest the interrogation unit in the interrogation zone AR. When receiving the signal from the proximity switch 40, the device 100 outputs a trigger TR to the reader/writer 200. When receiving the trigger TR to start the processing for reading or writing, the reader/writer 200 determines the target RF tag 300 for a read/write process, and performs the read/write process using the determined target RF tag 300. This allows the reader/writer 200 to perform the reading/writing process of the target RF tag 300 nearest the interrogation unit selectively from one or more RF tags 300 located within the interrogation zone AR.

Although the reader/writer 200 determines that an RF tag 300 has moved to the position nearest the interrogation unit upon reception of an input trigger TR from the device 100 in the embodiment, a trigger TR may not be input from the device 100. For example, a central processing unit (CPU) 241 may directly receive a trigger TR output from the proximity switch 40. In some embodiments, an image sensor may replace the proximity switch 40. The image sensor captures an image of a field including the above nearest position. When detecting an RF tag that has moved to the nearest position based on the recognition result of the captured image, the image sensor may input a trigger TR into the CPU 241. When the conveyor C operates at a constant speed, the CPU 241 may determine the time at which the RF tag on the conveyor C will reach the position nearest the interrogation unit based on the conveyor speed. The CPU 241 may then receive a trigger TR output from a timer (not shown) in a controller 240 when the timer reaches the determined time. A trigger TR may also be input by a user operation performed when an RF tag 300 has moved to the position nearest the interrogation unit.

The above position nearest the interrogation unit is at a predetermined distance from the interrogation unit. This position is preliminary determined through an experiment based on the relationship between the transmission power of the corresponding reader/writer 200 and an interrogation distance from the interrogation zone AR to fall between the interrogation distance at minimum power and the interrogation distance at maximum power.

Configuration of Device 100

Figure 2:
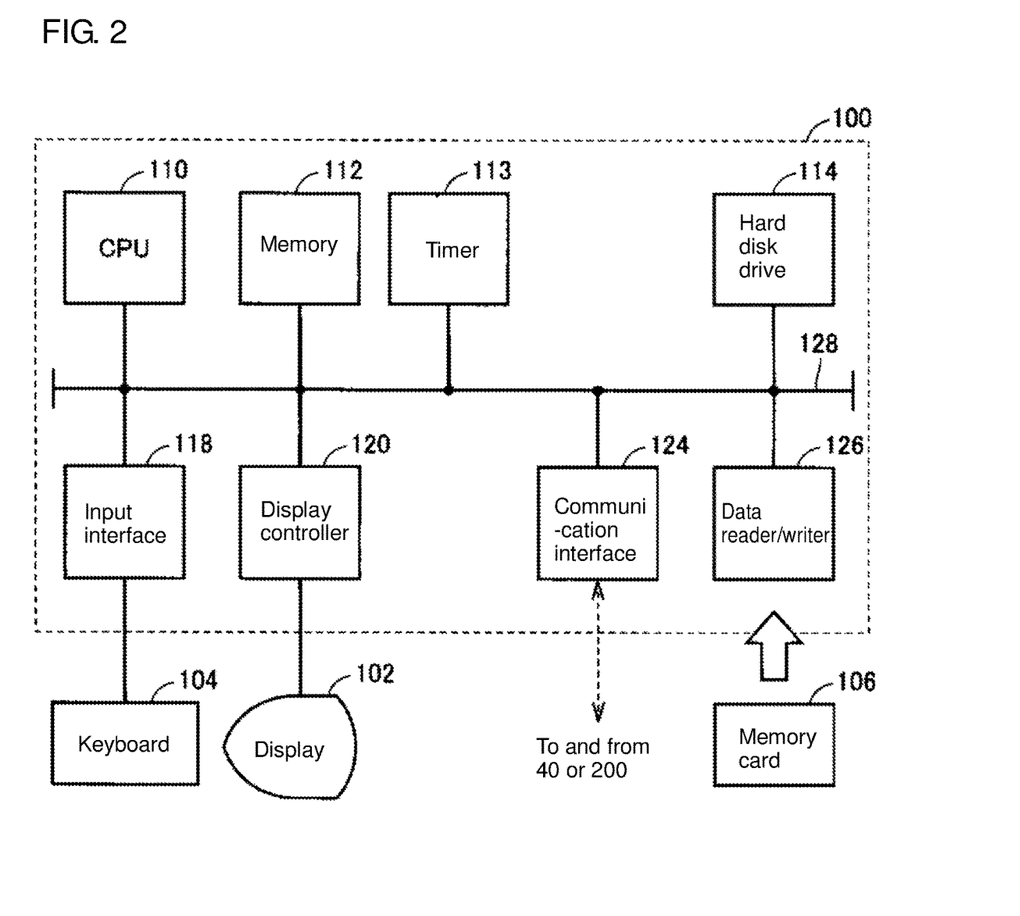
FIG. 2 is a schematic block diagram of a device 100 according to the embodiment.

FIG. 2 is a schematic block diagram of the device 100 according to the embodiment. Referring to FIG. 2, the device 100 includes a CPU 110, which is responsible for computation, a memory 112 and a hard disk drive 114 as its storage units, a timer 113, which keeps time and outputs timing data to the CPU 110, an input interface 118, a display controller 120, a communication interface 124, and a data reader/writer 126. These components are connected to one another with a bus 128 to allow data communication between them.

The CPU 110 performs various computations by executing programs (codes) stored in the hard disk drive 114. The memory 112, which is typically a volatile storage device such as a dynamic random access memory (DRAM), stores program data read from the hard disk drive 114, as well as data received from the reader/writer 200 and data about a workpiece.

The input interface 118 relays data transferred between the CPU 110 and an input device such as a keyboard 104, a mouse (not shown), and a touch panel (not shown). In other words, the input interface 118 receives operational instructions provided from a user operating the input device.

The display controller 120 is connected to a display 102, which is a typical example of a display device, and presents, for example, the processing results obtained by the CPU 110 to the user by displaying the information.

The communication interface 124 relays data transferred between the CPU 110 and the reader/writer 200 and the proximity switch 40 with a local area network (LAN). The data reader/writer 126 relays data transferred between the CPU 110 and a memory card 106, which is a storage medium.

The device 100 may be connected to another output device, such as a printer, as appropriate.

Configuration of Reader/Writer 200 and RF Tag 300

Figure 3:
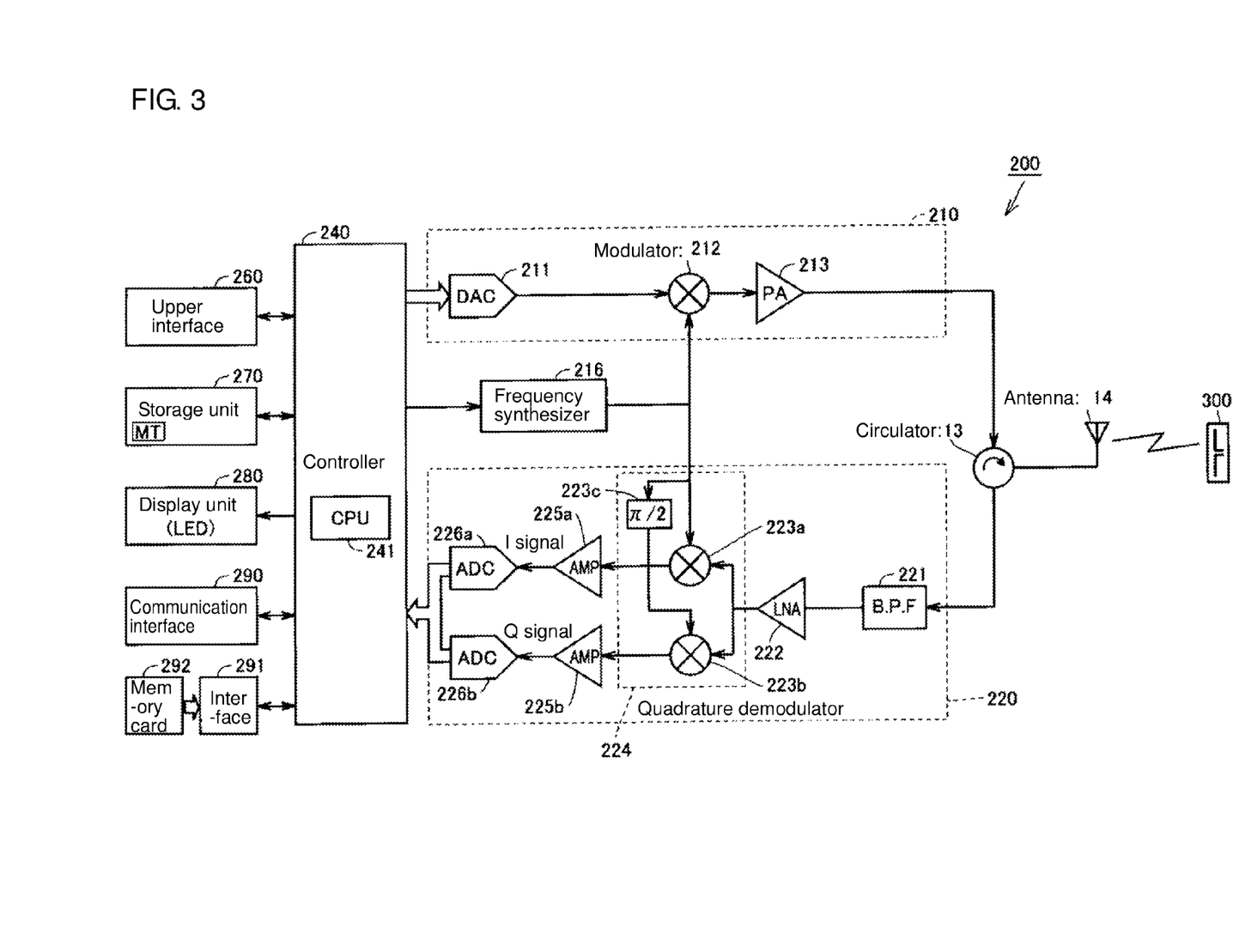
FIG. 3 is a block diagram of a reader/writer 200 according to the embodiment.
Figure 4:
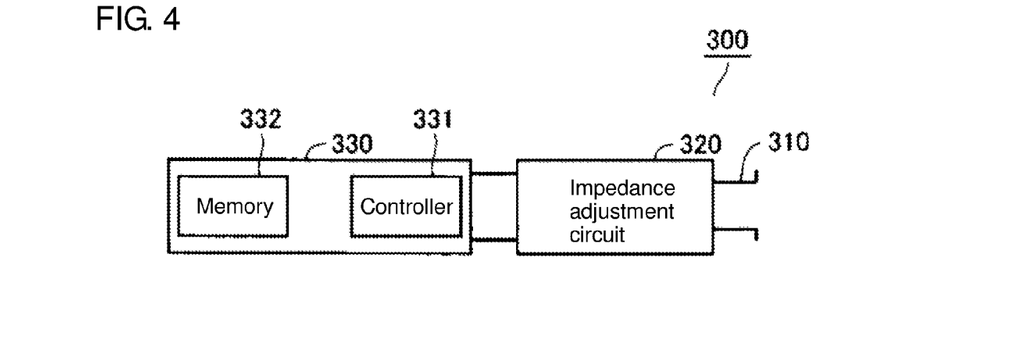
FIG. 4 is a block diagram of an RF tag 300 according to the embodiment.

FIG. 3 is a block diagram of the reader/writer 200 according to the embodiment. FIG. 4 is a block diagram of an RF tag 300 according to the embodiment. In the embodiment, the RF tag 300 in FIG. 4 is a passive tag, which has no internal power source and operates with the electromotive force generated by waves transmitted from the reader/writer 200. The RF tag 300 includes a tag integrated circuit (IC) 330 including a controller 331 and a semiconductor memory 332, and a communication unit. The communication unit includes an antenna 310 and an impedance adjustment circuit 320. In addition to a computer, the controller 331 includes, for example, a modem circuit for modulating or demodulating communication signals transmitted to and received from the reader/writer 200. The RF tag 300 may not be a passive tag, and may be a tag including an internal power source.

Referring to FIG. 3, the reader/writer 200 includes an interrogation unit for interrogating the RF tag 300, an antenna 14 connected to the interrogation unit, a controller 240 including a central processing unit (CPU) 241, a communication unit for communicating with the device 100, a storage unit 270, which is a volatile or nonvolatile storage medium such as a read-only memory (ROM) and a random-access memory (RAM), a display unit 280 including a numerical display and multiple display lamps (e.g., light emitting diodes, or LEDs), a communication interface 290 for communicating with an external network, and an interface 291.

The interrogation unit includes a transmission unit 210, a reception unit 220, a frequency synthesizer 216, and a circulator 13. The communication unit includes an upper interface 260, which is a communication module. The controller 240 controls the interrogation unit and the communication unit.

The interface 291 relays data transferred between the CPU 241 and a memory card 292, which is a storage medium. More specifically, the memory card 292 prestoring programs to be executed in the reader/writer 200 is distributed. The interface 291 reads a program from the memory card 292. The interface 291 also writes the processing results associated with the communication with the device 100 or with the RF tag 300 to the memory card 292 in response to an internal command from the CPU 241. The memory card 292 includes a general-purpose semiconductor device such as a compact flash (CF) and a secure digital (SD), a magnetic storage medium such as a flexible disk, or an optical storage medium such as a compact disk read-only memory (CD-ROM).

The controller 240 has the functions equivalent to the functions of a computer. More specifically, the CPU 241 performs data processing including a communication process with the device 100 and an interrogation process with the RF tag 300 in accordance with a program stored in the memory such as the storage unit 270. The controller 240 outputs a pulse signal representing a command associated with the interrogation process with the RF tag 300. This output signal is hereafter also referred to as a command signal.

The storage unit 270 stores programs and data for data processing. The storage unit 270 stores data to be read and/or written by the CPU 241 for performing the interrogation process.

The reception unit 220 that performs single side band (SSB) reception will now be described. Referring to FIG. 3, the reader/writer 200 includes a transmission unit 210, a reception unit 220, the circulator 13, the frequency synthesizer 216, and the controller 240. The circulator 13 forwards a signal transmitted from the transmission unit 210 to the antenna 14, and forwards a signal from the RF tag 300 received at the antenna 14 to the reception unit 220. The frequency synthesizer 216 provides carrier waves to the transmission unit 210 and the reception unit 220. The controller 240 controls the transmission unit 210 and the reception unit 220. The reader/writer 200 transmits and receives signals to and from the RF tag 300 via the antenna 14.

The transmission unit 210 includes a digital-to-analog (DA) converter 211, which converts a digital signal (including a command signal) from the controller 240 into an analog signal, a modulator 212, which is connected to the DA converter 211 and modulates a carrier wave from the frequency synthesizer 216 in response to a transmission base band signal, and a power amplifier 213. The output of the power amplifier 213 is input into the circulator 13.

The reception unit 220 includes a band pass filter (BPF) 221, which limits the band of a reception signal received from the circulator 13, a low-noise amplifier 222, which is connected to the band pass filter 221, and a quadrature demodulator 224, which receives an output signal from the low-noise amplifier 222 and a carrier wave from the frequency synthesizer 216 and outputs signals with phases shifted relative to each other by 90 degrees. The quadrature demodulator 224 includes multipliers 223a and 223b, and a π/2 phase shifter 223c, which shifts the phases of signals to demodulate the signals having phases orthogonal to each other. The signals I and Q, which are demodulated by the quadrature demodulator 224, are transmitted to the corresponding amplifiers 225a and 225b for amplifying these signals, and analog-to-digital (AD) converters 226a and 226b for converting these signals to digital signals. The signals I and Q are then combined and input into the controller 240. The quadrature demodulator 224, the amplifiers 225a and 225b, the AD converters 226a and 226b, and a demodulated signal processing unit (not shown) included in the controller 240 enable the demodulation function.

Interrogation Operation

To write or read data to or from the RF tag 300 in an interrogation operation performed between the reader/writer 200 shown in FIG. 3 and the RF tag 300 shown in FIG. 4, the reader/writer 200 transmits a command received from the device 100 to the RF tag 300, and receives a response to the command from the RF tag 300. The reader/writer 200 then transmits the received response to the device 100. The RF tag 300, which has no internal power source, receives waves transmitted from the antenna 14 and creates the electromotive force at the antenna 310 to drive the control circuit included in the RF tag 300 during the interrogation operation.

During the interrogation, the controller 240 in the reader/writer 200 outputs a command signal having a predetermined bit count as appropriate. The transmission unit 210 modulates a carrier wave using the command signal to superimpose the command signal onto the carrier wave.

A carrier wave transmitted from the antenna 14 through the above operation generates the electromotive force in the RF tag 300 that is within an interrogation zone. This activates the controller 331 in the RF tag 300. When a carrier wave having a command signal superimposed on the wave is transmitted from the antenna 14 in this state, the controller 331 in the RF tag 300 interprets a command indicated by the command signal and performs the designated processing, and then generates a response (response signal) including response data and returns the response to the reader/writer 200.

The reception unit 220 included in the reader/writer 200 receives the response signal from the RF tag 300. The reception unit 220 removes noise from the reception signal and demodulates the signal, and then converts the signal into digital data, which is output to the controller 240. The CPU 241 interprets the response from the RF tag 300 based on the demodulated digital data, and outputs the interrogation result data, including the interpreted data. For example, the CPU 241 transmits the result data to the device 100, stores the data into the storage unit 270, and displays the data on the display unit 280 or turns on the LEDs.

In the present embodiment, the RF tag 300 is a passive tag having no internal power source. The reader/writer 200 thus communicates with the RF tag 300 with a half-duplex scheme, under which the reader/writer 200 uses the antenna 14 commonly for both transmission and reception, but separates transmission signals and reception signals.

Functional Structure

Figure 5:
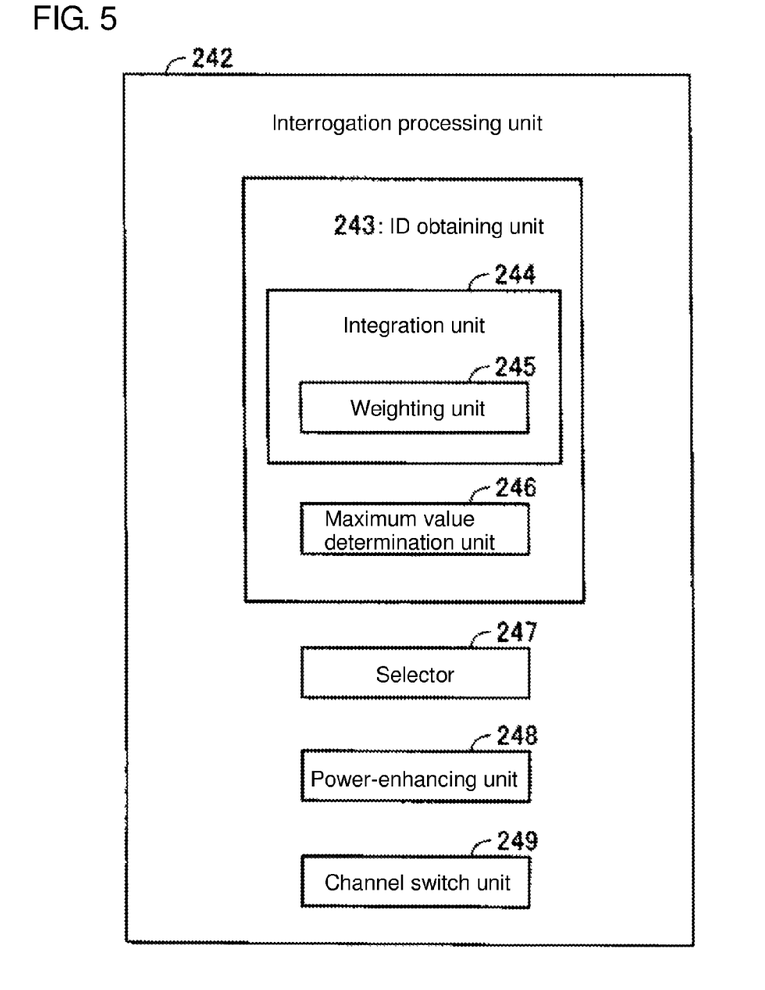
FIG. 5 is a functional block diagram of the reader/writer 200 according to the embodiment.

FIG. 5 is a functional block diagram of the reader/writer 200 according to the embodiment. Referring now to FIG. 5, the reader/writer 200 includes an interrogation processing unit 242, which performs processing for interrogating an RF tag 300 using the communication unit. The interrogation processing unit 242 includes an ID obtaining unit 243, which interrogates an RF tag 300 and obtains its identifier (ID). The ID obtaining unit 243 includes an integration unit 244, which performs time integration (accumulation) of the strength of every reception signal received by the interrogation unit from each RF tag 300. The integration unit 244 integrates the strength of a reception signal received from each RF tag while weighting the reception signal using a weight provided from a weighting unit 245. The weighting unit 245 outputs a weight that causes an integral value calculated for each reception signal in the order of signal reception (an integral value resulting from integration of the strength of a current reception signal) to be larger than an integral value calculated for a preceding reception signal (an integral value resulting from integration of the strength of a preceding reception signal). This weighted integration process will be described in detail later.

When receiving a trigger TR from the device 100, a maximum value determination unit 246 determines a maximum value from integral values calculated for the RF tags 300. A selector 247 selects an RF tag 300 having the maximum value as a target RF tag for a read/write process. A power-enhancing unit 248 enhances the transmission power to a predetermined value for performing the read/write process of the target RF tag 300. A channel switch unit 249 switches the channel (frequency band) to be used for interrogating the target RF tag 300.

The components shown in FIG. 5 are implemented by a program executed by the CPU 241 or by a combination of a program and a circuit. The program may include a plurality of program modules in correspondence with the components or may be a single program module for all these components.

Integration Process

In the embodiment, the target RF tag 300 is determined using the integral values resulting from the integration process described above. This method of determining the target RF tag 300 can prevent over-reading and under-reading.

Simulation of Integration

Determining the target RF tag 300 through the integration process can prevent over-reading and under-reading. This will be described based on an experiment conducted by the inventors.

The inventors simulated the integration process in the experiment. The simulation assumes that RF tags 300 pass through the interrogation zone AR defined near the integration unit either at regular or irregular intervals. In this simulation, each RF tag 300 on the conveyor C is transported at a maximum transportation speed of 6 m/min, and an RF tag 300 at a maximum distance of 2 m from an antenna can be interrogated. In this case, the interrogation zone AR has a distance of about 1 m including a margin. In this case, the reader/writer 200 can interrogate an RF tag 300 for at least ten seconds.

Although this integration process uses a received signal strength indicator (RSSI) as the strength of a reception signal, the value indicating the signal strength may not be an RSSI. The strength of a reception signal from the RF tag 300 is assumed to be unchanged within the interrogation zone AR when the RF tag 300 is moving in the zone.

Figure 6:
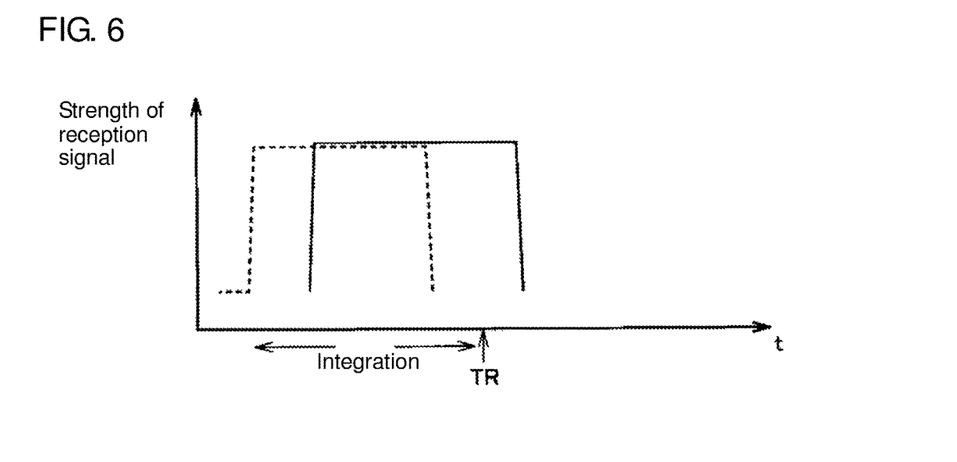
FIG. 6 is a schematic diagram showing the simulation results for an integration process.
Figure 7A:
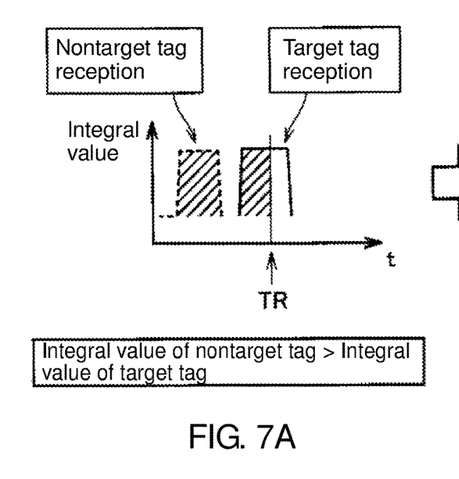
FIGS. 7A and 7B are schematic diagrams showing the simulation results for an integration process.
Figure 7B:
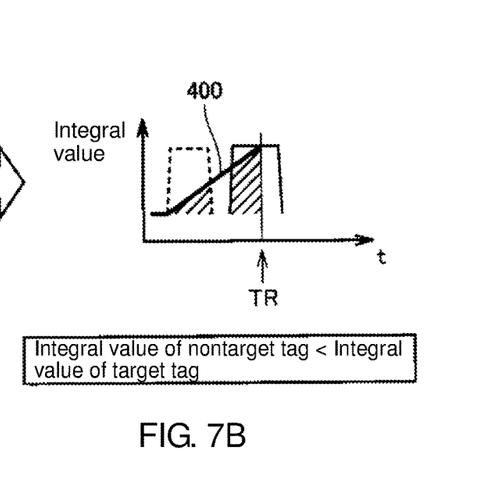

FIGS. 6 and 7 are schematic diagrams showing the simulation results for the integration process. In FIG. 6, the vertical axis shows the value of received power indicating the strength of a reception signal, whereas the horizontal axis shows time. In the experiment, a nontarget RF tag 300 first moves on the conveyor C, and is followed by a target RF tag 300. In this case, changes in the strength of reception signals received by the reader/writer 200 are detected as shown in FIG. 6. In FIG. 6, a broken line indicates changes in the strength of a signal received from the nontarget RF tag 300, and a solid line indicates changes in the strength of a signal received from the target RF tag 300.

FIG. 7A shows changes in integral values resulting from time integration performed over the integration time for the strength of every signal received from the nontarget RF tag 300 indicated by the broken line and from the target RF tag 300 indicated by the solid line in FIG. 6, in correspondence with the strength of the reception signal from the nontarget RF tag 300 and the strength of the reception signal from the target RF. The integration time is determined based on the above time period for which interrogation can be performed.

When receiving a trigger TR from the device 100, the reader/writer 200 determines an RF tag 300 having a maximum integral value as a target RF tag 300. In FIG. 7A, the nontarget RF tag 300 has a maximum integral value. In this case, the reader/writer 200 can erroneously determine the nontarget RF tag 300 as a target for an interrogation process. This causes over-reading and under-reading.

In contrast, the integration using weighting prevents over-reading and under-reading. More specifically, the integration unit 244 performs integration while weighting the strength of every reception signal received from each RF tag using a weight $\alpha$ ($0<\alpha<1$) provided from the weighting unit 245. The weighted strength of the reception signal is calculated as, for example, the reception strength×$\alpha$. A weight $\alpha(n)$ to be used for an n-th reception signal is set larger than a weight ($\alpha(n-1)$) to be used for an (n−1)th reception signal preceding the n-th reception signal. As indicated by a line 400 in the graph of FIG. 7B, the integral values after the weighting process (hatched part) are smaller as they are older (newer integral values are larger).

In this manner, the integration unit 244 integrates the strength of a reception signal received from the nontarget RF tag 300 indicated by the broken line and the strength of a reception signal received from the target RF tag 300 indicated by the solid line shown in FIG. 6 while adding the weighting values to the strength values. As shown in FIG. 7B, the integral value (the area of the hatched part) for the target RF tag 300 is larger than the integral value (the area of the hatched part) for the nontarget RF tag 300 when a trigger TR is input. Based on the experimental results shown in FIG. 7B, the inventors have noticed that the weighted integration process maximizes the integral value of the target RF tag 300 when the trigger TR is input, and thus can avoid over-reading and under-reading.

Processing

Figure 8:
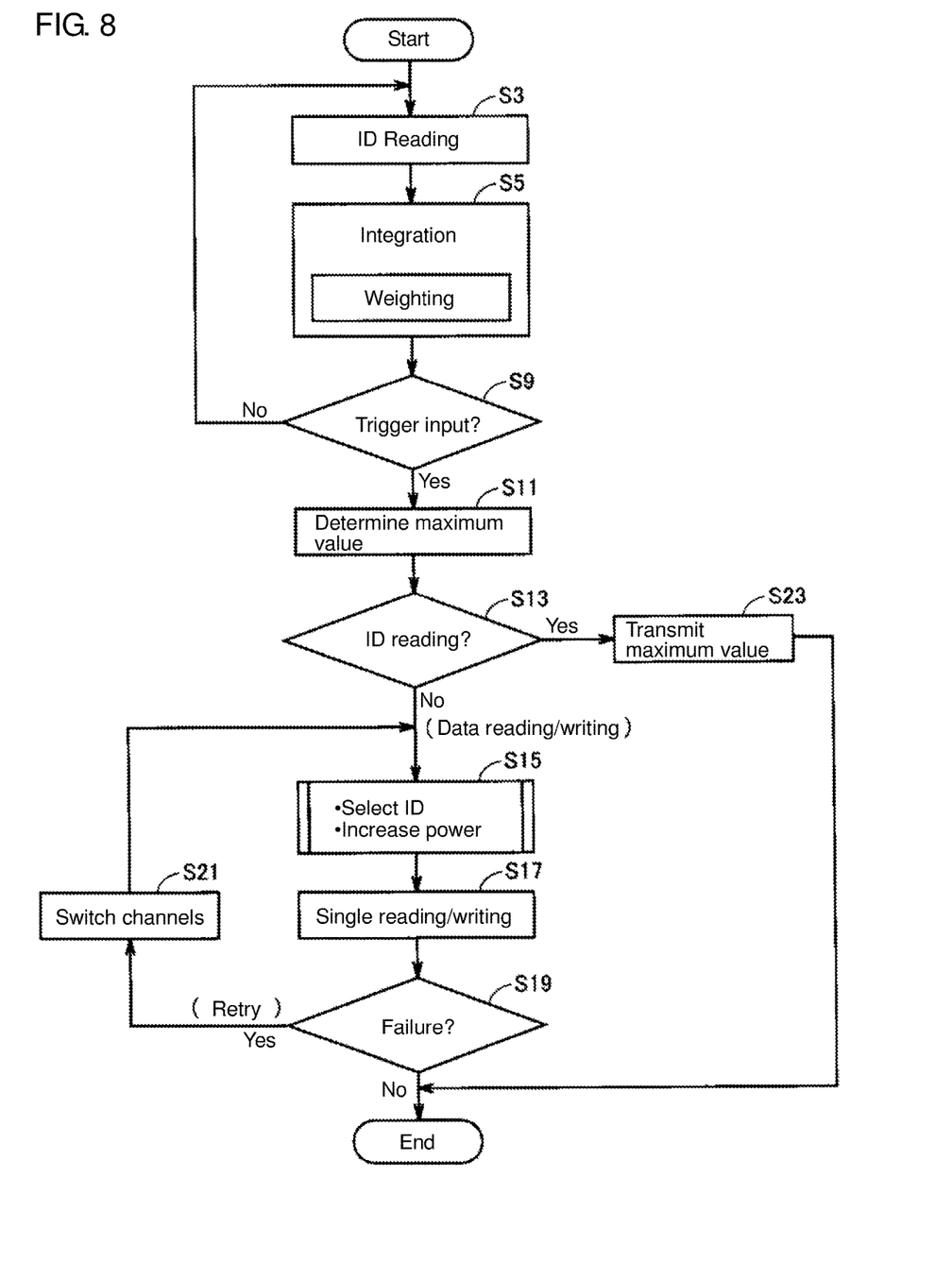
FIG. 8 is a flowchart showing an interrogation process performed by the reader/writer 200 according to the embodiment.
Figure 9:
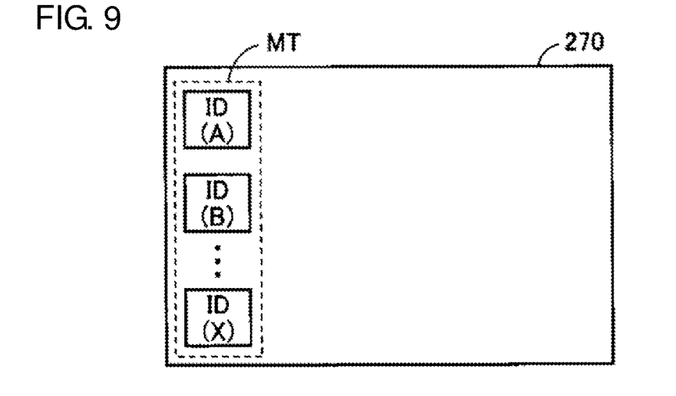
FIG. 9 is a diagram describing the storage format of integral values according to the embodiment.

FIG. 8 is a flowchart showing the interrogation process performed by the reader/writer 200 according to the embodiment. The storage unit 270 prestores a program for implementing the integration process. The CPU 241 reads the program from the storage unit 270 and executes the program. FIG. 9 is a diagram describing the storage format of integral values according to the embodiment. In the processing described below, RF tags 300 on the conveyor C pass through the interrogation zone AR either at regular or irregular intervals.

The ID obtaining unit 243 first performs an ID reading process for transmitting a command signal for requesting an ID from an RF tag 300 in response to a control command provided from the device 100 (step S3). In the ID reading process, the ID obtaining unit 243 receives, from each RF tag 300 located within the interrogation zone AR, a signal transmitted in response to the request for the ID. The response includes the ID of the corresponding RF tag 300.

The integration unit 244 integrates the strength of a reception signal received as a response from the RF tag 300 while weighting the strength using the weight provided from the weighting unit 245, and stores the resultant integral value into an area MT in the storage unit 270 (step S5). The integral value for the ID of each RF tag 300 is stored into the area MT. As shown in FIG. 9, for example, the integral values ID(A) and ID(B) to ID(X) are stored into the area MT in correspondence with the IDs A and B to X.

The interrogation processing unit 242 determines whether the RF tag 300 has moved to a predetermined position within the interrogation zone AR, or in other words, whether a trigger TR has been input from the device 100 (step S9). When the interrogation processing unit 242 determines that no trigger TR has been input (No in step S9), the processing returns to step S3 to repeat the processing in step S3 and subsequent steps. The ID reading process (step S3) and the integration process (step S5) are thus repeated until a trigger TR is input. Through every repetition of these processes, the strength of a reception signal received from each RF tag 300 is weighted and the weighted value is added to the integral value of each RF tag 300 located within the area MT (to the preceding integral value). This updates the integral value.

When the interrogation processing unit 242 determines that a trigger TR has been input (Yes in step S9), or in other words when the RF tag 300 has moved to the predetermined position within the interrogation zone AR, the maximum value determination unit 246 determines a maximum integral value from the integral values for the RF tags 300 located within the area MT (step S11). This determines the target RF tag 300 to be used in the subsequent interrogation process.

The interrogation processing unit 242 then determines whether the command signal provided from the device 100 is for ID reading or for data reading/writing (step S13). When determining that the received command signal is for ID reading (Yes in step S13), the interrogation processing unit 242 transmits, to the device 100, the maximum integral value determined by the maximum value determination unit 246 in association with the corresponding ID (step S23). The processing ends.

When determining that the received command signal is for data reading/writing (No in step S13), the interrogation processing unit 242 interrogates the determined target RF tag 300 (steps S15 to S21).

More specifically, the selector 247 reads an ID corresponding to a maximum value selected from integral values calculated for the RF tags 300 located within the area MT, and sets a read/write command signal for the ID. The power-enhancing unit 248 also controls a power amplifier 213 to increase the power for transmitting a read/write command signal to be greater than the transmission power for ID reading (step S15). For example, the transmission power is maximized.

The interrogation processing unit 242 then transmits the set command signal through the interrogation unit. This causes the read/write process (single read/write process) for the target RF tag 300 (step S17).

In the read/write process, the interrogation processing unit 242 determines whether the read/write process has been successful based on a response from the target RF tag 300 (step S19). When determining that the read/write process has failed (Yes in step S19), the interrogation processing unit 242 retries the read/write process. In this case, the channel switch unit 249 controls a frequency synthesizer 216 to switch the oscillation frequency (channel) to another channel (step S21). The processing then returns to step S15, in which the read/write process described above is repeated for the other channel. When determining that the read/write process has been successful (No in step S19), the processing ends.

In step S15 in FIG. 8, the ID of the target RF tag 300 determined through the weighted integration process for ID reading is used. This prevents over-reading. In step S15, the transmission power is increased to prevent the strength of a reception signal from the target RF tag 300 from decreasing. This prevents under-reading. The read/write process is retried with the frequency channels being switched. This increases the success rate of the read/write process and prevents under-reading.

Modifications

The embodiment may be modified variously as described below.

Other Integration Process

Although the Integration process described above is repeated upon every reception of a signal from an RF tag 300 until a trigger TR is input, the method for integration may not be limited to this. The integration process may start when a trigger TR is input. This modification will now be described.

Figure 10:
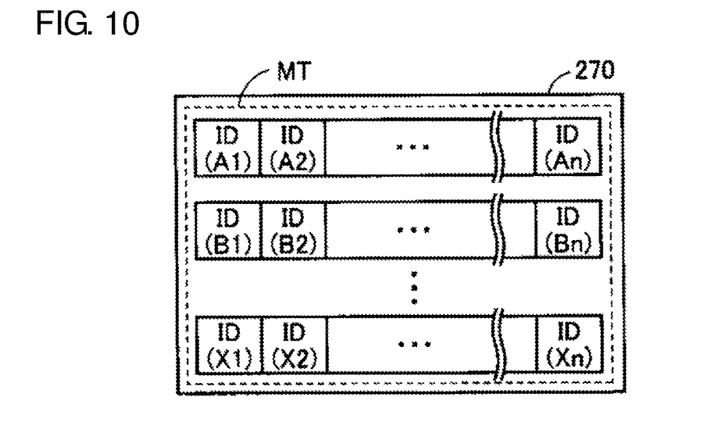
FIG. 10 is a diagram describing another example of the storage format of integral values according to the embodiment.

FIG. 10 is a diagram describing another example of the storage format of integral values according to the embodiment. The integration process starts upon reception of an input trigger TR. In this integration process, the strength of a reception signal received from each RF tag 300 is stored into the area MT upon every reception of a signal from each RF tag 300 until a trigger TR is input (refer to FIG. 9). For example, the strength of a reception signal is stored in the order of signal reception. When receiving an input trigger TR, the integration unit 244 integrates the signal strength for each RF tag 300 shown in FIG. 10 using a weight provided from the weighting unit 245. For example, the integration unit 244 integrates the strength of a reception signal while weighting the signal in the order of signal reception. This integration method can also determine an RF tag having a maximum value from integral values calculated for the RF tags 300 as a target RF tag 300 for the read/write process.

Through the integration process using the storage format shown in FIG. 10, the strength values of reception signals received within the integration time can be stored into the area MT, although this process uses more memory than the integration process using the storage format of the area MT shown in FIG. 9. The reception strength values stored in the area MT in FIG. 10 are output to the display unit 280 (or to the display 102) to output chronological changes in the strength of signals received from each RF tag 300. Monitoring such changes in the output reception strength values allows detection of any abnormal values.

The area MT may also store, for each RF tag 300, both the integral values shown in FIG. 9 and the strength values of chronologically sequential reception signals shown in FIG. 10.

Interpolation of Reception Signal

Figure 11:
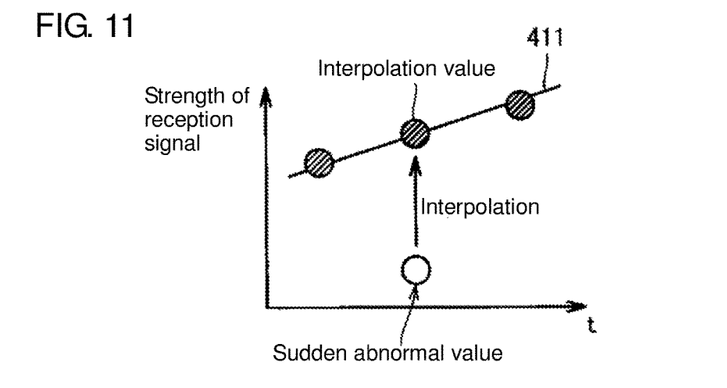
FIG. 11 is a diagram describing interpolation of the strength of a reception signal according to the embodiment.

FIG. 11 is a diagram describing interpolation of the strength of a reception signal according to the embodiment. As shown in FIG. 11, the strength of a reception signal from the RF tag 300 can typically change in the manner indicated by a line 411 as the RF tag 300 moves on the conveyor C. However, noise or radio interference in the interrogation zone AR can greatly change the strength of the reception signal. This change can then be detected as a sudden abnormal value in FIG. 11. The abnormal value in the integration process can lower the accuracy of the resultant integral value.

In the embodiment, an interpolation value shown in FIG. 11 is used to replace an abnormal value. For example, the interpolation value is calculated based on the strength of signals received before and after the occurrence of an abnormal value, and the calculated value (e.g., an average) is used to interpolate the value. The interpolation value replaces and eliminates the abnormal value, which can otherwise be used in the above integration process. This prevents the accuracy of the integral value from decreasing.

Changing the Weight

Figure 12:
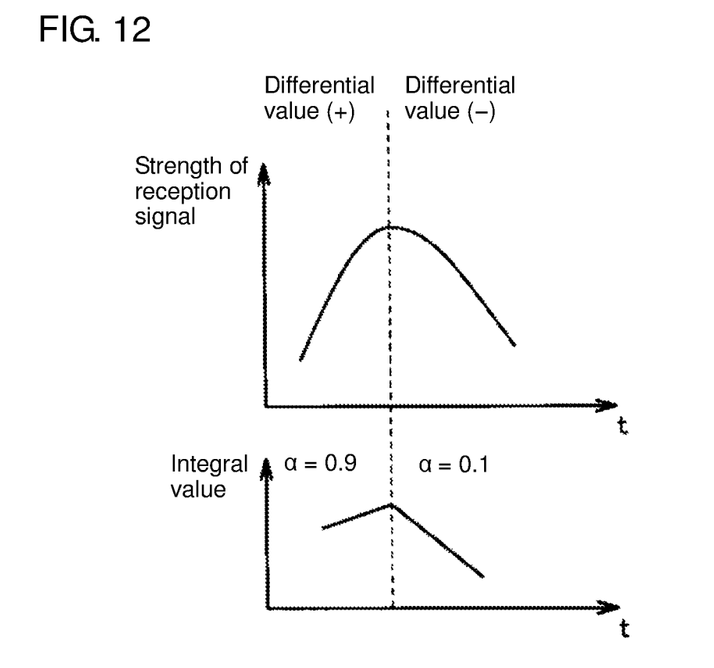
FIG. 12 is a diagram describing changing of the weighting value according to the embodiment.

FIG. 12 is a diagram describing changing of the weighting value according to the embodiment. In the above embodiment, the weighting value may be changed in accordance with changes in the strength of signals received from each RF tag 300 located within the integration time.

More specifically, the weighting unit 245 differentiates the strength of chronologically sequential reception signals, and calculates a change in the signal strength based on the obtained differential value. Referring to FIG. 12, the weighting unit 245 uses a weight α, which is for example 0<α<0.9 when the differential value has a positive sign +, or in other words, when the signal strength tends to increase. When the differential value changes from a positive to a negative value, the weighting unit 245 changes the weight to, for example, 0<α<0.1. In this manner, the RF tag 300 that moves away from the interrogation zone AR can have a smaller integral value more promptly (refer to the lower part on FIG. 12). This allows easy determination of a target RF tag 300 having a maximum integral value.

Example of Weighted Integration

Although the weighted integration according to the embodiment uses weighting of every reception signal received from each RF tag, the strength of the reception signal may not be weighted, and the integral value may be weighted instead.

More specifically, the integral value is weighted as the integral value×α every time when the integral value is calculated (step S5) after the ID reading process (step S3). A weight α(n) to be used for an n-th reception signal is set larger than a weight (α(n−1)) to be used for an (n−1)th reception signal preceding the n-th reception signal. In this case as well, the integral value can be changed in the manner indicated by the line 400 in the graph of FIG. 7B.

Other Example of Weighted Integration

The integral value may also be weighted by subtracting a predetermined weight β from the integral value. For a weight β, a weight β(n) to be subtracted from an n-th calculated integral value (in an n-th ID reading process) by the weighting unit 245 is set smaller than a weight (β(n−1)) to be subtracted from an (n−1)th integral value preceding the n-th reception signal. In this case as well, the integral value can be changed as indicated by the line 400 in the graph of FIG. 7B.

Eliminating Integral Value

Figure 13:
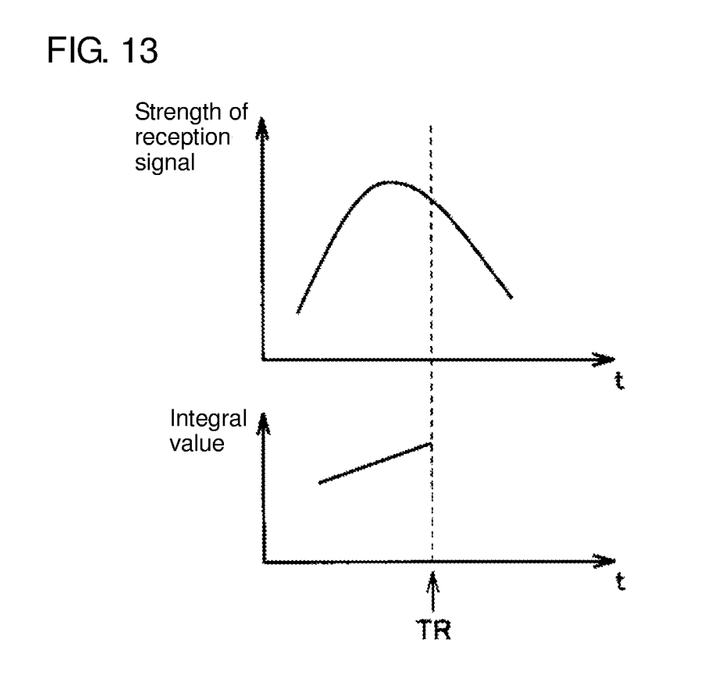
FIG. 13 is a diagram describing elimination of an integral value from an area MT according to the embodiment.

FIG. 13 is a diagram describing elimination of an integral value from the area MT according to the embodiment. The interrogation processing unit 242 determines a target RF tag 300 having a maximum value from the integral values in the area MT (refer to FIG. 9) or the strength values of the reception signals received within the integration time (refer to FIG. 10) in the embodiment. After this determination, at least the data about the target RF tag 300 may be eliminated from the area MT (refer to the lower part on FIG. 13). This allows effective use of the area MT.

Eliminating Stationary RF Tag 300

A stationary RF tag 300 (not moving) may be located in the interrogation zone AR in the embodiment. The interrogation process in the embodiment excludes the stationary RF tag 300.

The interrogation processing unit 242 differentiates the change in the strength of the chronologically sequential signals received from each RF tag 300 within a given period of time stored in the area MT, or in other words, detects the change gradient (magnitude). The interrogation processing unit 242 determines the ID of the RF tag 300 having the resultant differential value (gradient) not more than a predetermined value (e.g., substantially zero) and then stops (suspends) the integration process for the RF tag 300 with the determined ID. The interrogation processing unit 242 eliminates, for example, the corresponding data from the area MT, and excludes the ID from a target for ID reading (step S3).

In this manner, a stationary RF tag 300 in the interrogation zone AR is identified and is excluded from a target for ID reading. This reduces the processing load of the ID reading process (more specifically, the integration process), and prevents wasteful use of the area MT.

Movable Reader/Writer 200

Although the RF tags 300 on the conveyor C move and the reader/writer 200 is stationary in the embodiment, the relationship may be reversed. The reader/writer 200 may move and the RF tags 300 may be stationary. In this case, the target RF tag 300 is determined based on a maximum integral value obtained through the weighted integration using the strength of each reception signal from the stationary RF tags 300.

Changing the Weight Setting

The weight used by the weighting unit 245 may be variable in the embodiment. A user may perform an operation to change the weight. In this case, the display unit 280 may display the currently set weight.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST 13 circulator
14 antenna
30 cable
40 proximity switch
100 device
102 display
104 keyboard
106, 292 memory card
112 memory
113 timer
114 hard disk drive
118 input interface
120 display controller
124, 290 communication interface
200 reader/writer
210 transmission unit
211, 226a, 226b converter
212 modulator
213 power amplifier
216 frequency synthesizer
220 reception unit
221 band pass filter
222 low-noise amplifier
223a, 223b multiplier
223c phase shifter
224 quadrature demodulator
225a, 225b amplifier
240, 331 controller
260 upper interface
270 storage unit
280 display unit
291 interface
300 RF tag
310 antenna
320 impedance adjustment circuit
AR interrogation zone

The invention claimed is:

1. An interrogation device, comprising:
an interrogation unit;
a communication unit; and
a controller coupled to the interrogation unit and the communication unit, the controller configured with a program to perform operations for controlling the interrogation unit and the communication unit; the operations comprising:
causing the interrogation unit to interrogate a radio frequency (RF) tag in a contactless manner;
causing the communication unit to transmit and receive data to and from a host device;
performing, for each RF tag passing through an interrogation zone that is defined near the interrogation unit, an integration process of integrating a strength of a reception signal from the RF tag received by the interrogation unit, wherein the integration process comprises weighting an integral value of the strength of the reception signal in a manner to cause an integral value calculated for each reception signal to be larger than an integral value calculated for a preceding reception signal; and
transmitting, when the RF tag moves to a predetermined position in the interrogation zone from the communication unit to the host device, an identifier of an RF tag having a maximum integral value selected from the integrated values calculated for each RF tag.

2. The interrogation device according to claim 1, wherein the controller is further configured with the program to perform operations such that the integration process further comprises:
weighting the strength of the reception signal every time the signal from the RF tag passing through the interrogation zone is received by the interrogation unit; and
integrating the weighted strength of the reception signal for each RF tag.

3. The interrogation device according to claim 1, wherein the controller is further configured with the program to perform operations such that the integration process further comprises changing a weight value used in the weighting.

4. The interrogation device according to claim 3, wherein when the strength of the reception signal from the RF tag changes to a value smaller than the strength of a preceding reception signal, the controller is further configured with the program to perform operations such that the integration processes further comprises setting a smaller weight than used for the preceding reception signal.

5. The interrogation device according to claim 1, wherein when the strength of the reception signal from the RF tag is unchanged from the strength of a preceding reception signal from the RF tag, the controller is further configured with the program to perform operations such that the integration processes further comprises excluding the strength of the reception signal from the RF tag from the integration process.

6. A system comprising an interrogation device and a host device,
the host device comprising:
a central processing unit (CPU);
a memory; and
a communication interface coupled to the CPU and the memory;
the interrogation device comprising:
an interrogation unit;
a communication unit; and
a controller configured with a program to perform operations for controlling the interrogation unit and the communication unit; the operations comprising:
causing the interrogation unit to interrogate a radio frequency (RF) tag in a contactless manner;
causing the communication unit to transmit and receive data to and from the host device, via the communication interface;
performing, for each RF tag passing through an interrogation zone that is defined near the interrogation unit, an integration process of integrating a strength of a reception signal from the RF tag received by the interrogation unit, wherein the integration process comprises weighting an integral value of the strength of the reception signal in a manner to cause an integral value calculated for each reception signal to be larger than an integral value calculated for a preceding reception signal; and
transmitting, when the RF tag moves to a predetermined position in the interrogation zone from the communication unit to the host device, via the communication interface, an identifier of an RF tag having a maximum integral value selected from the integrated value calculated for each RF tag.

7. The system of claim 6, wherein the controller is configured with the program to perform operations such that the integration process further comprises changing a weight value used in the weighting.

8. The system of claim 7, wherein when the strength of the reception signal from the RF tag changes to a value smaller than the strength of a preceding reception signal, the controller is configured with the program to perform operations such that the integration process further comprises setting a smaller weight than used for the preceding reception signal.

9. The system of claim 6, wherein when the strength of the reception signal from the RF tag is unchanged from the strength of a preceding reception signal from the RF tag, the controller is configured with the program to perform operations such that the integration process further comprises excluding the strength of the reception signal from the RF tag from the integration process.

10. A non-transitory computer-readable medium storing instructions, which, when executed, cause a controller to perform operations for controlling an interrogation device to implement an interrogation method, the interrogation device comprising an interrogation unit, the operations comprising:
performing, for each of a plurality of radio frequency (RF) tags passing through an interrogation zone that is defined near the interrogation unit, an integration process of integrating a strength of a reception signal from the RF tag received by the interrogation unit, wherein the integration process comprises weighting an integral value of the strength of the reception signal in a manner to cause an integral value calculated for each reception signal to be larger than an integral value calculated for a preceding reception signal; and transmitting, to a host device, an identifier of an RF tag having a maximum integral value selected from the integrated value calculated for each RF tag when the RF tag moves to a predetermined position in the interrogation zone.

11. The non-transitory computer-readable medium of claim 10, wherein the instructions cause the controller to perform operations such that the integration process further comprises changing a weight value used in the weighting.

12. The non-transitory computer-readable medium of claim 11, wherein when the strength of the reception signal from the RF tag changes to a value smaller than the strength of a preceding reception signal, the instructions cause the controller to perform operations such that the integration process further comprises setting a smaller weight than used for the preceding reception signal.

13. The non-transitory computer-readable medium of claim 10, wherein when the strength of the reception signal from the RF tag is unchanged from the strength of a preceding reception signal from the RF tab, the instructions cause the controller to perform operations such that the integration process further comprises excluding the strength of the reception signal from the RF tag from the integration process.

* * * * *